United States Patent [19]

Ito et al.

[11] Patent Number: 4,826,569

[45] Date of Patent: May 2, 1989

[54] PROCESS FOR PRODUCING A FIBER AGGREGATE

[75] Inventors: Tomohito Ito, Ohbu; Renichi Isomura, Kariya; Hidetoshi Hirai, Ichinomiya; Fukuo Gomi, Nagoya, all of Japan

[73] Assignee: Kabushiki Kaisha Toyoda Jidoshokki Seisakusho, Aichi, Japan

[21] Appl. No.: 99,899

[22] Filed: Sep. 22, 1987

[30] Foreign Application Priority Data

Sep. 26, 1986 [JP] Japan ................................ 61-228788

[51] Int. Cl.$^4$ .............................................. D21H 5/26
[52] U.S. Cl. .................................... 162/102; 162/145; 162/192
[58] Field of Search ............... 162/102, 192, 152, 145, 162/212, 217; 264/24, 108

[56] References Cited

U.S. PATENT DOCUMENTS 3,497,419 2/1970 Winer et al. ......................... 162/192
3,626,041 12/1971 Fields et al. ......................... 162/192

FOREIGN PATENT DOCUMENTS 1914316 10/1970 Fed. Rep. of Germany ........ 264/24

*Primary Examiner*—Peter Chin
*Attorney, Agent, or Firm*—Berman, Aisenberg & Platt

[57] ABSTRACT

The feature of the present invention is that a fiber mixture of silicon carbide or silicon nitride whiskers and alumina or alumina-silica short fibers with 1 to 45 volume percent of the short fibers in relation to the total volume of the whiskers and short fibers is used in the following steps for producing a fiber aggregate: a dispersion step of dispersing whiskers and short fibers into a dielectric fluid; an orientation step of placing the dielectric fluid containing the fibers dispersed therein in a space between a positive electrode and a negative electrode across which a high voltage is applied, whereby causing individual fibers in the dielectric fluid to electrostatically orient, with one end pointing to the positive electrode and the other end pointing to the negative electrode; and an aggregating step of aggregating the electrostatically oriented fibers while keeping the oriented step. The fiber mixture is used in order to grow the bridgings of whiskers around the short fibers as cores. Thus the fiber sedimentation is accelerated by densely bridged fibers while maintaining a satifactory orientation. Hence a whisker aggregate with a larger fiber volume ratio Vf can be formed in a shorter period of time.

5 Claims, 2 Drawing Sheets

PROCESS FOR PRODUCING A FIBER AGGREGATE

BACKGROUND OF THE INVENTION

1. Field of the Invention

The present invention relates to a process for producing fiber aggregate, and more particularly, it relates to a process for obtaining an optimum fiber aggregate, in which many of fibers are oriented one-dimensionally, especially for the fiber reinforced metal application.

2. Description of the Prior Arts

Conventionally, a fiber aggregate of short fibers or whiskers have been produced by the following processes:

A centrifugal forming process (Japanese Published Unexamined Patent Application No. 65200/1985) has been employed to form the fiber aggregate. According to the process, a fiber suspension is supplied in a porous cylindrical vessel having a lining of a filtration membrane, and the filtrate is dissipated by the centrifugal force to form a fiber aggregate having a hollow.

A suction forming process has been also employed to form the fiber aggregate. According to the process, a fiber suspension supplied in a cylinder is pressurized by a plunger while forcibly draining the filtrate via the filtering substance from the bottom of the cylinder.

However, the fiber aggregate obtained by the above forming processes have many of fibers oriented in two or three-dimensional direction, and the fiber volume ratio is low. Accordingly, it shows a very poor result in the fiber reinforced metal application aiming to improve the strength and control the thermal expansion.

SUMMARY OF THE INVENTION

To solve the problems mentioned above, the following process is considered.

That is, a fiber suspension dispersing fibers in a dielectric fluid is poured into an electric field generated between a positive electrode and a negative electrode to orient the fibers electrostatically and bridge the fibers simultaneously with the electostatical orientation. Then the oriented fibers are aggregated by sequential sedimentation, and a fiber aggregate in which many of fibers are one-dimentionally oriented is obtained.

However, there arises many problems when applying such basic technology to an industrial operation.

For instance, when whiskers are used as the fibers, the bridging becomes sparse and the speed of the sedimentation becomes slow because the whiskers are very minute fibers. Further the bridging is damaged during the sedimentation and the fiber orientation might be disturbed because the bridging is sparse.

It is an object of the present invention to make the bridging dense by mixing different fibers selectively.

To solve the problems mentioned above, the present invention employs a fiber mixture in which whiskers are mixed with a small amount of short fibers in order to grow whisker bridgings around the short fibers as cores. To put it concretely, the present invention employs a new arrangement in which the fibers comprise a mixture of whiskers and short fibers, and a mixing rate of short fibers is 1 to 45 volume percent in relation to total volume of the whiskers and short fibers.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
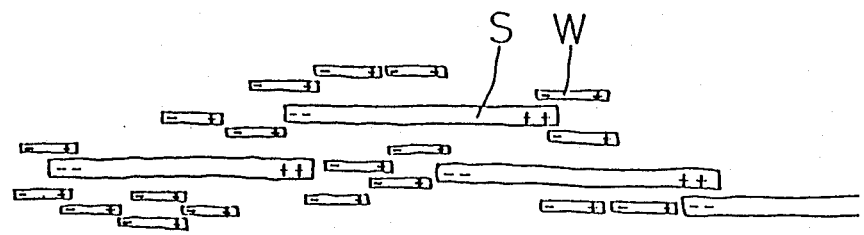
FIG. 1 is a schematic illustration showing an orientation and bridging state of a fiber mixture according to the present invention.

When whiskers and short fibers mixed in a predetermined mixing ratio are dispersed in a dielectric fluid to form a fiber suspension and the fiber suspension is placed in an electric field, the whiskers and short fibers polarize and orient in one-dimensional direction. As can be seen from FIG. 1, minute whiskers W adhere around stable bridgings of short fibers S, and bridgings of whiskers W grow densely around short fibers S as cores having larger electrostatic energy than that of whiskers W. Thus the fibers sediment quickly while maintaining the stable bridging state against the disturbance of the fiber suspension.

The inside of the positive and negative electrode may be covered with a diaphragm to control the turbulent flow of the fiber suspension. The diaphragm may preferably be an ion exchange membrane. If such is the case, the inside of the positive electrode is covered with an anion exchange membrane, and the inside of the negative electrode is covered with a cation exchange membrane. Thus the disturbance of the fiber suspension due to ions can be skillfully avoided, because the anion exchange membrane prevents the transmission or intrusion of cations, generated at the positive electrode, into the fiber orientation area, and similarly the cation exchange membrane prevents the transmission or intrusion of anions, generated at the negative electrode, into the fiber orientation area.

The production of a fiber aggregate starts with the preparation of a fiber suspension by dispersing a fiber mixture of whiskers and short fibers in a dielectric fluid.

For the aforementioned whisker, a silicon carbide whisker or a silicon nitride whisker is preferred. For the aforementioned short fiber, an alumina short fiber or an alumina-silica short fiber is preferred. The practically used whisker has the fiber diameter of 0.1 to 1 $\mu$m and the fiber length of 5 to 100 $\mu$m. The practically used short fiber has the fiber diameter of 1 or 20 $\mu$m and the fiber length of 10 to 5000 $\mu$m. These dimensions are approximate values.

The mixing ratio of the short fibers is 1 to 45 volume percent in relation to the total volume of the whiskers and short fibers. If the mixing ratio of the short fibers is less than 1 volume percent, the short fibers work poorly as the core for growing the bridgings of whiskers. If the mixing ratio is more than 45 volume percent, the physical property of short fiber itself, which is poorer in strength than the whisker, adversely affects and reduces the strength of a fiber reinforced metal. More preferably, the value is 5 to 40 volume percent. Particularly, when the mixing ratio of the short fibers falls within the range, the strength of a fiber reinforced metal becomes because the operation of the short fibers as cores works effectively.

The dielectric fluid means a fluid which exhibits the dielectric property upon application of a voltage. Examples of the dielectric fluid include carbon tetrachloride, fluorine and chlorine-substituted hydrocarbons, n-hexane, and cyclohexane. Carbon tetrachloride is the most preferably dielectric fluid among them. Fluorine and chlorine-substituted hydrocarbons are preferably from the handling and safety view points. Further, it is preferable to add an appropriate amount of a nonionic surfactant to disperse the fibers in the dielectric fluid as evenly as possible.

The next step of the fiber aggregate production is the generation of an electric field between the positive and negative electrode. Then, the fiber dispersion is poured into the electric field to orient fibers so that an end of fibers points to the positive electrode and the other end of fibers points to the negative electrode (one-dimensional orientation). And at the same time the fibers are sedimented while they are bridged.

The strength of the electric field generated upon the application of a voltage between the positive and negative electrode is usually approximately 0.5 to 5 kv/cm. If the strength is about 0.2 kv/cm or less, the fibers are not satisfactorily oriented electrostatically. If the strength is about 10 kv/cm or more, the accuracy of the fiber orientation deteriorates due to the occurrence of the disturbance in the fiber suspension. The most preferable electric field strength is approximately 1 to 2 kv/cm. For the electric field, not only an electric field generated by a direct current but also an electric field generated by an alternate current may be used. However, the most preferable electric field strength depends on fibers used, the dielectric property of dielectric fluid used, and the thickness of fiber aggregate to be produced.

The fibers are quickly sedimented according to the present invention because of the whiskers and short fibers electrostatically oriented in one-dimensional direction are densely bridged around the short fibers as cores in the orientation direction as earlier mentioned.

The pouring of the fiber suspension continues until the aggregate reaches a desired thickness. Approximately same amount of fluid as the amount of the poured suspension is drained through the bottom of the vessel. When draining, it is important to take precautions against the turbulent flow. It is preferred to drain the fluid naturally or by suction after the flow amount has been so controlled as to make the flow free from the mechanical disturbance. It is effective to drain the fluid via the filtering substance disposed at the bottom of the vessel to avoid escaping fibers and turbulent fluid as well as to control the flow amount. For the filtering substance, a porous ceramic may be used.

The fiber aggregate thus aggregated is taken out of the vessel after the draining of the residual dielectric fluid has been completed. It is made into a fiber molded body for a fiber reinforced metal by cutting the fiber aggregate to desired dimensions and configurations.

Figure 2:
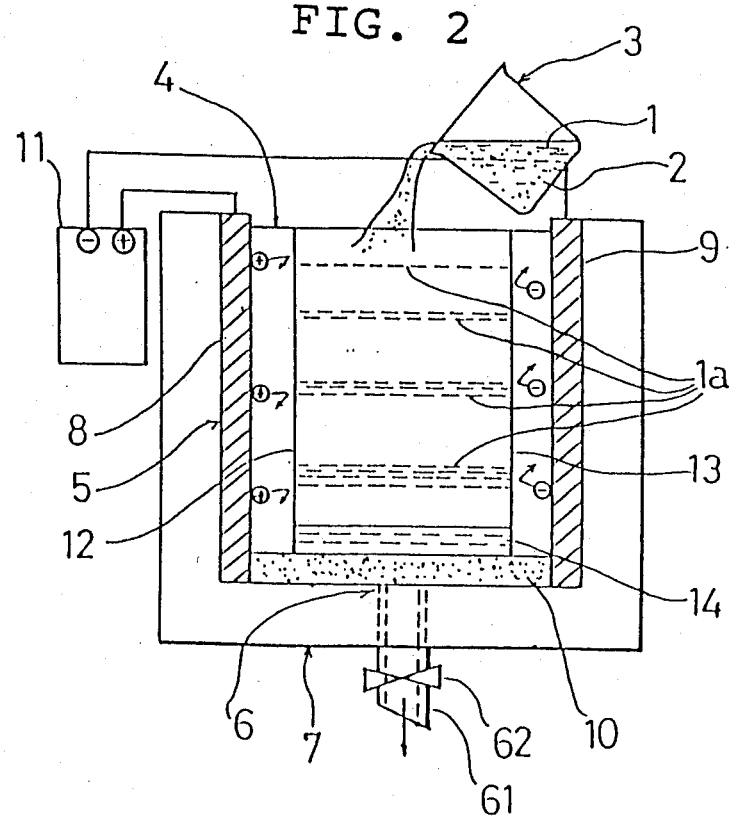
FIG. 2 is a schematic sectional view of an apparatus for embodying the present invention.

When embodying the process for producing a fiber aggregate according to the present invention, for instance, an apparatus as schematically illustrated in FIG. 2 is used. The apparatus comprises the following:

a reservoir section 4 with an opening at the top for receiving a fiber suspension 2, in which a fiber mixture 1 is dispersed in a dielectric fluid, from a container 3, a draining section 6 for draining the filtrate of the fiber suspension 2 downward via a filtering substance 10, an orientation bath 7 having an orientation section 5 for orienting and bridging fibers 1a between the reservoir section 4 dn the draining section 6, a pair of a positive electrode 8 and negative electrode 9 disposed vertically at a predetermined interval, an anion exchange membrane 12 and a cation exchange membrane 13 respectively disposed inside the positive electrode 8 and the negative electrode 9, and a voltage applicator 11 for generating an electric field between the positive electrode 8 and negative electrode 9.

And a pipe 61 and a cock 62 are draining means connectable to a suction apparatus (not shown) installed to the aforementioned draining section 6.

Advantages of the Invention

Since the process for producing a fiber aggregate according to the present invention employs a fiber mixture in which short fibers are added to whiskers in a predetermined mixing ratio in order to grow the bridgings of whiskers around the short fibers as cores in the following steps:

a dispersion step of dispersing short fiber and whisker into an dielectric fluid;

an orientation step of placing said dielectric fluid containing said fibers dispersed therein in a space between a pair of electrodes across which a high voltage is applied, whereby causing individual fibers in the dielectric fluid to electrostatically orient, with one end pointing to one of said electrodes and the other end pointing to the other electrode; and an aggregating step of aggregating the electrostatically oriented fibers while keeping the oriented step, the fiber sedimentation and aggregation is accelerated by densely bridged fibers while maintaining a satisfactory orientation. Hence a whisker aggregate with a larger fiber volume ratio Vf can be formed in a shorter period of time.

DESCRIPTION OF THE PREFERRED EMBODIMENT

For fibers, silicon carbide whiskers and alumina short fibers were used. The alumina short fibers were mixed with the silicon carbide whiskers. And the each mixing ratio of the short fibers in relation to the total volume of the whiskers and short fibers was 0, 1, 5, 10, 20, 40 and 50 volume percent. These fiber mixtures were respectively dispersed in a dielectric fluid comprising a fluorine and chroline-substituted hydrocarbon to obtain fiber suspensions.

And the electrostatic orientation apparatus as shown in FIG. 2 was made ready. The apparatus is made up of the orientation bath 7, the paired positive electrode 8 and negative electrode 9, and the voltage applicator 11. The orientation bath 7 is made up of the reservoir section 4 to receive the dielectric fluid 2 in which the fiber mixture is dispersed; the draining section 6 to discharge the dielectric fluid 2; and the orientation section 14 in which the dielectric fluid moves downward across the reservoir section 4 and the draining section 6. The positive electrode 8 and negative electrode 9 are vertically disposed at a certain distance apart horizontally in the orientation section 14 of the orientation bath 7. The voltage applicator 11 applies a high voltage across the positive electrode 8 and negative electrode 9 to generate an electric field.

Then an electric field of 1 kv/cm electric field strength was generated between the positive and negative electrode of an apparatus shown in FIG. 2 in which the positive and negative electrode were disposed at the interval of 10 cm. Then the fiber suspensions were respectively poured into the electric field. And the sedimentation time required to reach the aggregated height of 10 mm was measured with the fluid draining stopped. The fiber concentration of the fiber suspension was 5 g/liter.

The sedimentation time of the fiber suspensions are listed in Table 1.

TABLE 1

| Short fiber mixing ratio (volume %) | 0 | 1 | 5 | 10 | 20 | 40 | 50 |
|---|---|---|---|---|---|---|---|
| Sedimentation time (sec.) | 447 | 439 | 426 | 394 | 360 | 323 | 271 |

After sedimenting the fibers as aforementioned, the dielectric fluid was filtered through the filter 10 by opening the cock 62 provided to the pipe 61. The fibers were aggregate in one-dimentionally oriented state on the filter 10, and then the fibers were dried to make a fiber aggregate.

The fiber aggregates having the aforementioned mixing ratios of short fibers were made to have the fiber volume ratio Vf's, of 20 and 30%. And these aggregates were made into composites with an aluminum alloy (Japanese Industrial Standard Code: AC1A) by a high pressure casting, thus test pieces made up of fiber reinforced metal were manufactured. The test pieces having 5 mm width, 3 mm thickness and 50 mm length were prepared for a bending test. The fibers in the test pieces were oriented in the longitudinal direction of the test pieces.

Fulcrums and an indenter were disposed in perpendicular to the fiber orientation direction in the bending test. The bending test was performed under the following conditions:

the distance between fulcrums: 30 mm, and
the descending speed of indenter: 1 mm/min.

Figure 3:
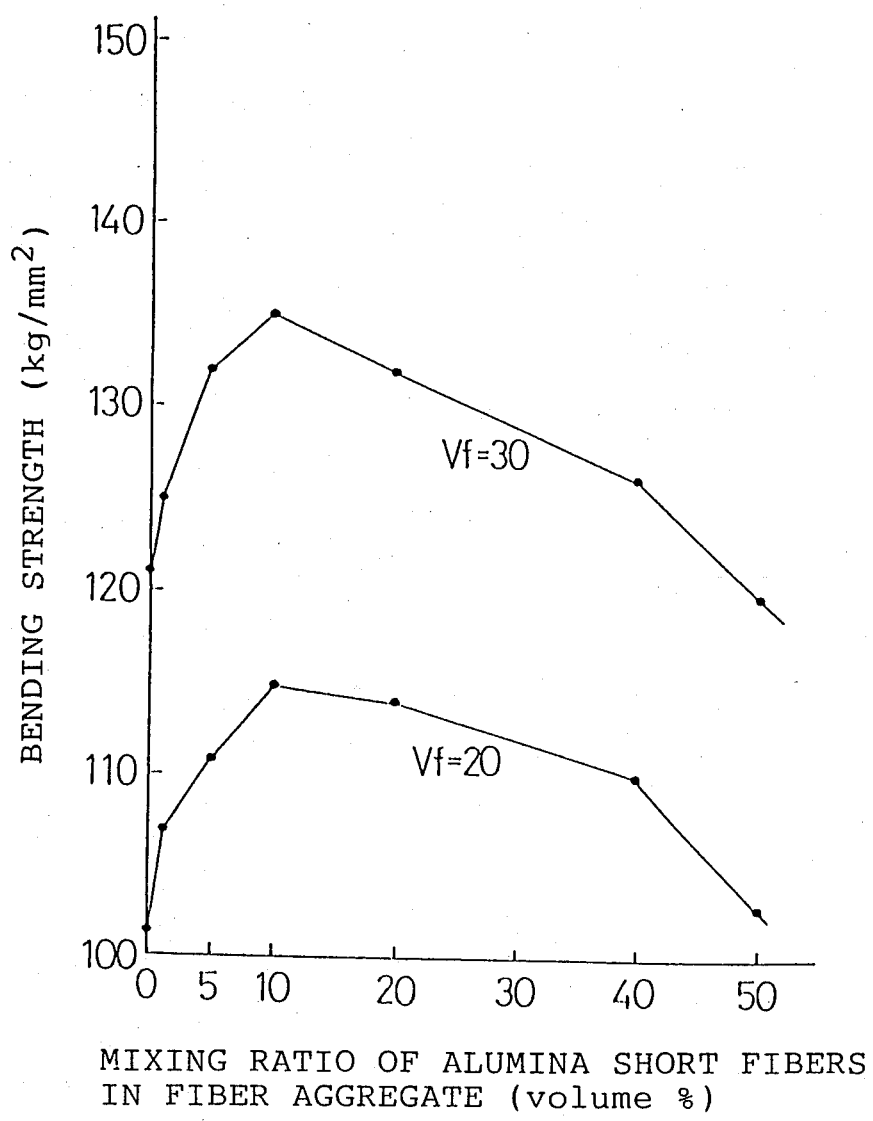
FIG. 3 is a graph comparing bending strength of fiber reinforced metals by fiber mixtures.

FIG. 3 illustrates the bending strength by the fiber mixtures.

As shown in FIG. 3, when test pieces had the same fiber volume ratio Vf, test pieces having 1 to 45% of the short fiber mixing ratio exhibited larger bending strength. Particularly, when the mixing ratio fell in the range of 5 to 40%, the bending strength further increased, and when it was 10%, the bending strength was the largest.

What is claimed is:

1. A process for producing a fiber aggregate which comprises:

a dispersion step of dispersing fibers in a mixture comprising orientable whiskers and orientable short fibers into a dielectric liquid;

an orientation step of placing said dielectric liquid containing said fibers dispersed therein in a space between a pair of electrodes across which as high voltage is applied, whereby causing said individual whiskers and short fibers in the dielectric liquid to electrostatically orient, with one end pointing to one of said electrodes and the other end pointing to the other electrode; and an aggregating step of aggregating the electrostatically oriented fibers while maintaining their orientation, wherein said fibers comprise a mixture of orientable whiskers and orientable short fibers, and a mixing ratio of said short fibers is 1 to 45 volume percent in relation to the total volume of said whiskers and said short fibers.

2. A process for producing a fiber aggregate according to claim 1, wherein said whiskers comprise silicon carbide or silicon nitride, and said short fibers comprise alumina or alumina-silica.

3. A process for producing a fiber aggregate according to claim 1, wherein said whiskers have a diameter of 0.1 $\mu$m to 1 $\mu$m and a length 5 $\mu$m to 100 $\mu$m, and said short fibers have a diameter of 1 $\mu$m to 20 $\mu$m and a length of 10 $\mu$m to 5000 $\mu$m.

4. A process for producing a fiber aggregate according to claim 1, wherein the mixing ratio of the short fibers is 5 to 40 volume percent in relation to the total volume of said whiskers and said short fibers.

5. A process of claim 1 further comprising an agglomerating step which takes place before the aggregating step, said agglomerating step causing oriented whiskers to form bridgings between oriented short fibers.

* * * * *

UNITED STATES PATENT AND TRADEMARK OFFICE
CERTIFICATE OF CORRECTION

PATENT NO. : 4,826,569
DATED : May 2, 1989
INVENTOR(S) : ITO, et al.

It is certified that error appears in the above-identified patent and that said Letters Patent is hereby corrected as shown below:

Column 1, line 14, change "have" to --has--.

Column 2, line 66, after "becomes", please insert --better--.

Column 3, line 7, change "preferably" to --preferable--.

Column 3, line 37, after "because", please insert --many--.

Column 4, line 3, change "dn" to --and--.

Column 6, line 11, change "as high" to --a high--.

Signed and Sealed this

Third Day of October, 1989

*Attest:*

DONALD J. QUIGG

*Attesting Officer*   *Commissioner of Patents and Trademarks*